United States Patent [19]

Bauer

[11] Patent Number: 4,775,273
[45] Date of Patent: Oct. 4, 1988

[54] BISTABLE SHAFT RETAINING ELEMENT

[76] Inventor: Peter Bauer, 13921 Esworthy Rd., Germantown, Md. 20767

[21] Appl. No.: 227,725

[22] Filed: Jan. 23, 1981

[51] Int. Cl.[4] .................................................. F16B 21/14
[52] U.S. Cl. ...................... 411/517; 411/515; 411/516; 411/513; 411/521; 411/358; 403/377
[58] Field of Search .............. 411/356, 357, 358, 359, 411/364, 365, 513, 514, 515, 516, 517, 520, 521, 530, 338, 368, 177; 403/377

[56] References Cited

U.S. PATENT DOCUMENTS

| | | | |
|---|---|---|---|
| 639,337 | 12/1899 | Anthony | 411/513 |
| 1,194,426 | 8/1916 | Richey | 411/356 X |
| 1,467,781 | 9/1923 | Dawson | 411/338 |
| 1,664,890 | 4/1928 | Kresci | 411/353 X |
| 1,988,345 | 1/1935 | Vaughn | 411/516 X |
| 2,299,752 | 10/1942 | Johnson | 411/516 |
| 2,368,544 | 1/1945 | Hogan | 411/514 |
| 2,401,856 | 6/1946 | Brock | 411/517 |
| 2,503,854 | 4/1953 | Trainor | 411/520 |
| 3,118,718 | 1/1964 | Babey | 411/368 |
| 3,233,497 | 2/1966 | McCormick | 403/377 |
| 3,483,789 | 12/1969 | Wurzel | 411/517 |
| 3,604,738 | 9/1971 | Alpaugh | 29/453 X |

FOREIGN PATENT DOCUMENTS

| | | | |
|---|---|---|---|
| 1111462 | 7/1961 | Fed. Rep. of Germany | 411/356 |
| 2835299 | 2/1979 | Fed. Rep. of Germany | 411/513 |
| 678356 | 4/1962 | Italy | 411/514 |
| 207794 | 6/1924 | United Kingdom | 411/177 |
| 570228 | 6/1945 | United Kingdom | 411/356 |
| 1191194 | 5/1970 | United Kingdom | 411/515 |

Primary Examiner—Gary L. Smith
Assistant Examiner—Curtis B. Brueske
Attorney, Agent, or Firm—Griffin, Branigan & Butler

[57] ABSTRACT

A positionally bistable domed annular disc includes a projection which engages a transverse through hole or a recess in a shaft to be retained. The disc fits concentrically about the shaft and is concave in different directions when in its two stable positions, respectively. In a cotter pin embodiment the projection extends from the outer rim of the disc and is bent to fit solidly in a transverse hole in the shaft. The projection is inserted when the disc is convex toward the hole and not surrounding the shaft. When switched to be concave toward the hole the disc surrounds the shaft to preclude longitudinal and rotative movement of the projection. In a retainer ring embodiment the projection is a plurality of fingers extending from one or both rims and arranged to engage the shaft or the bore in which the shaft is retained in its closed position. In a shaft coupling embodiment the projecting fingers engage two or more shafts in a manner which tolerates axial, radial and angular shaft misalignment.

8 Claims, 5 Drawing Sheets

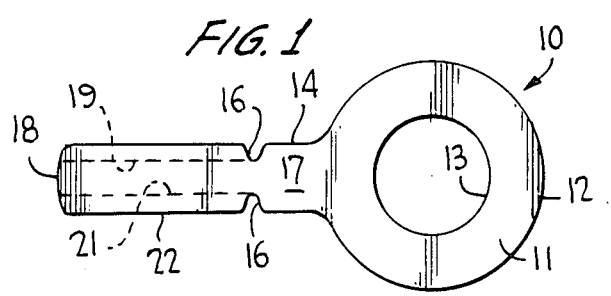
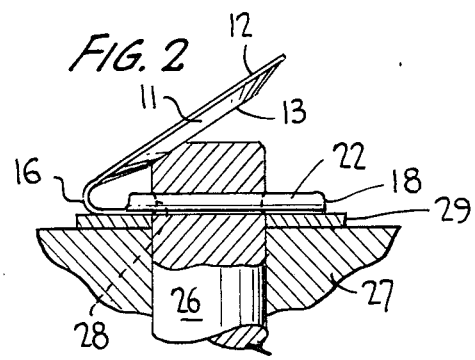
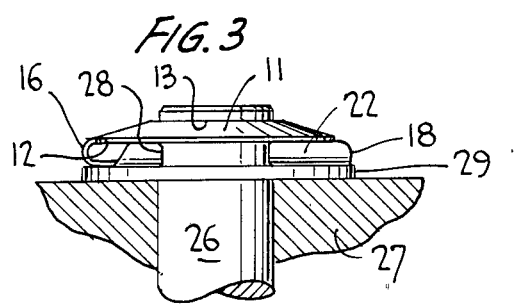
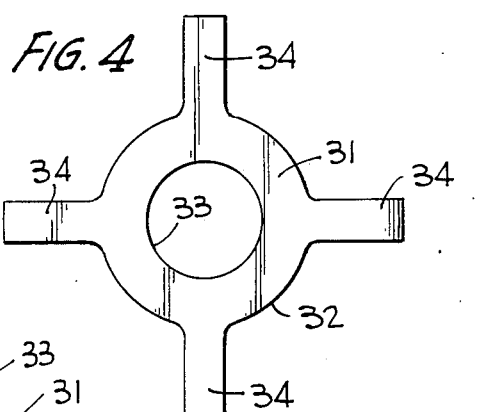
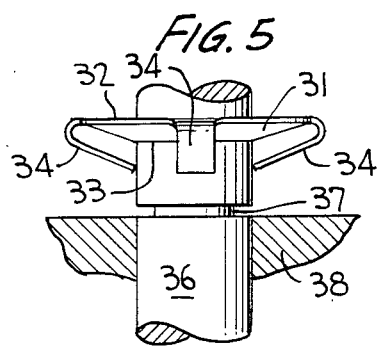
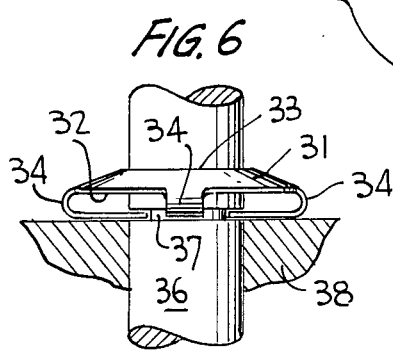
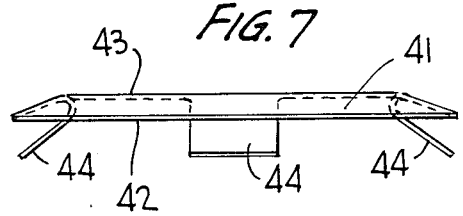
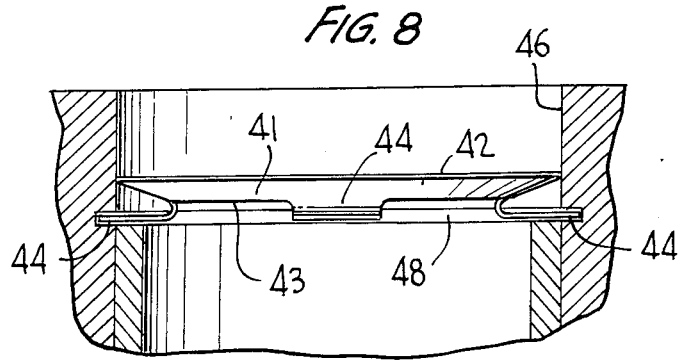
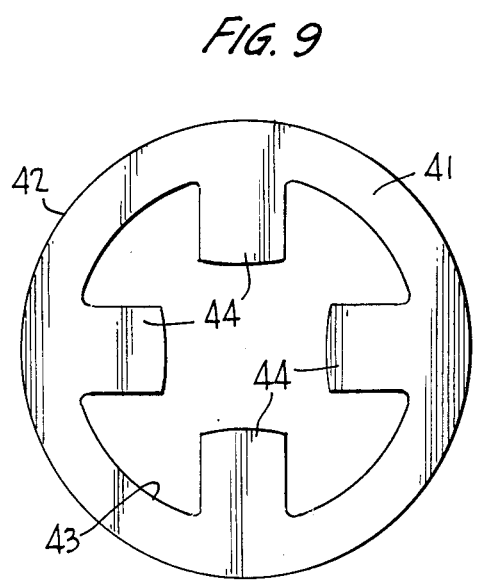

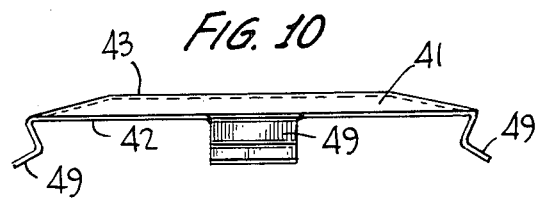
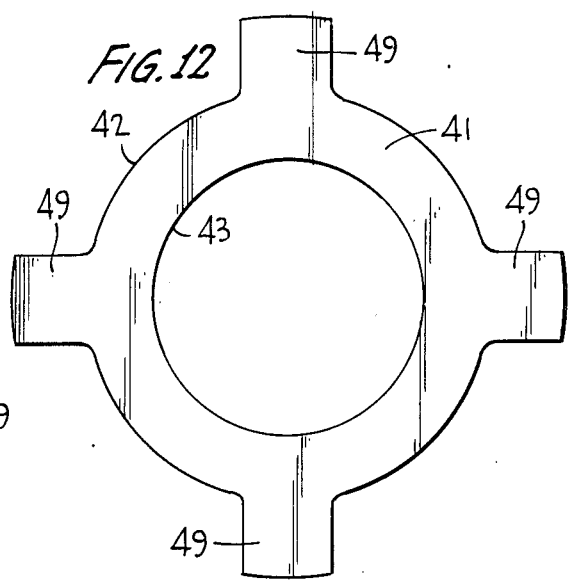
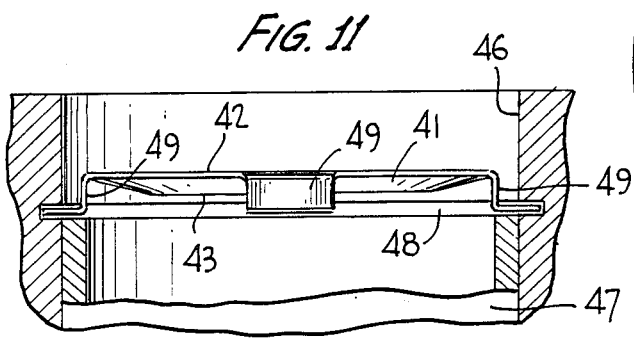
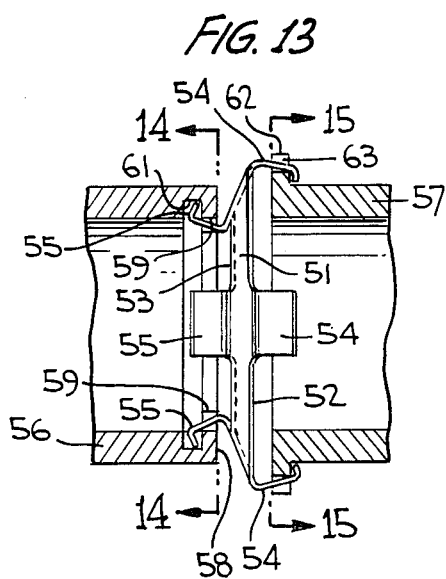
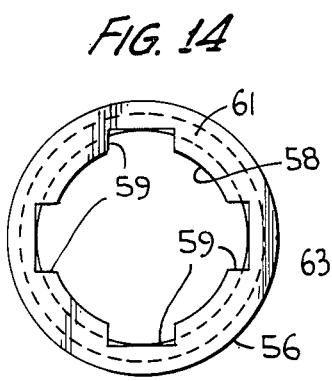
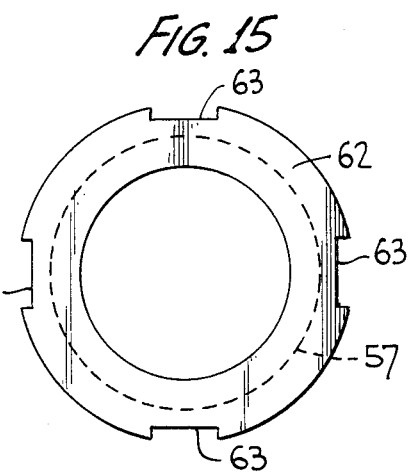
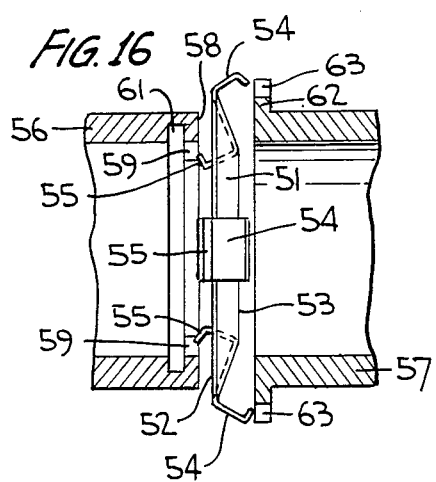
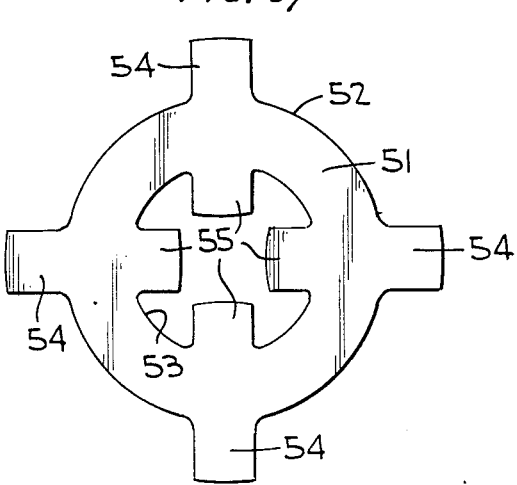

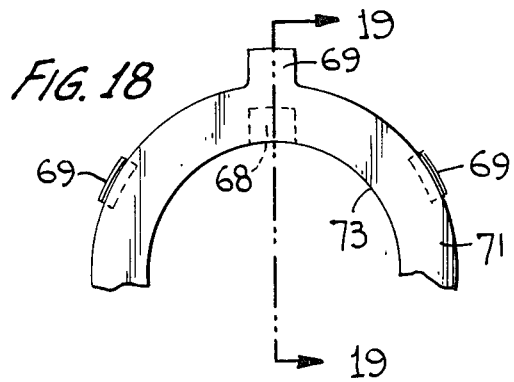
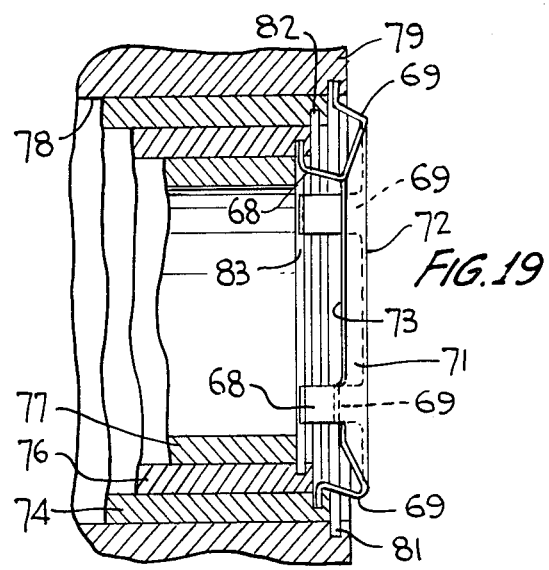
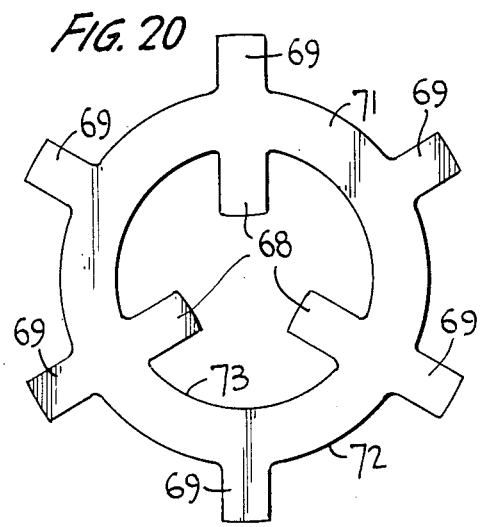
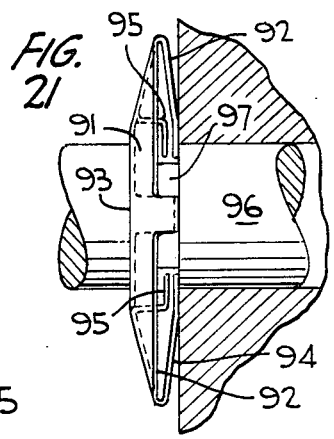
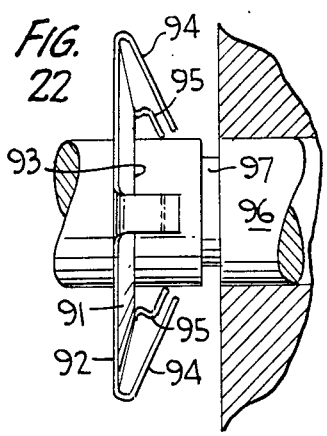
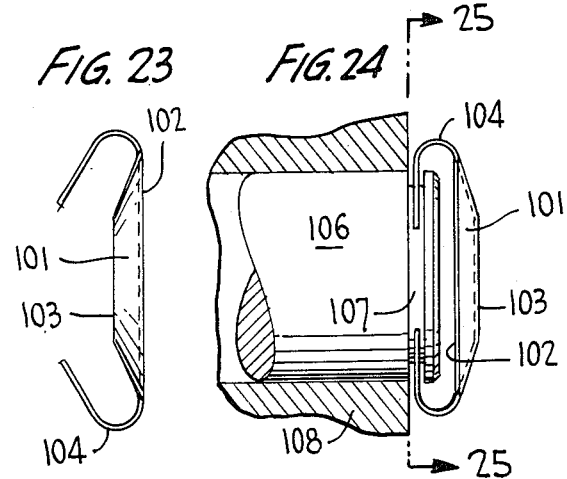
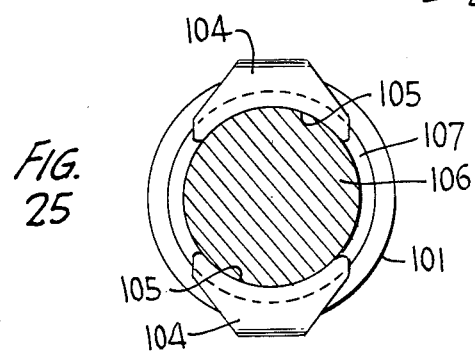
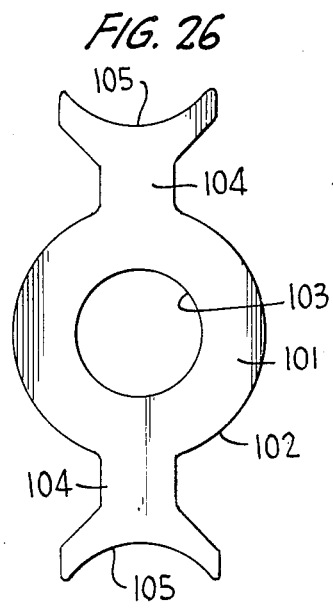

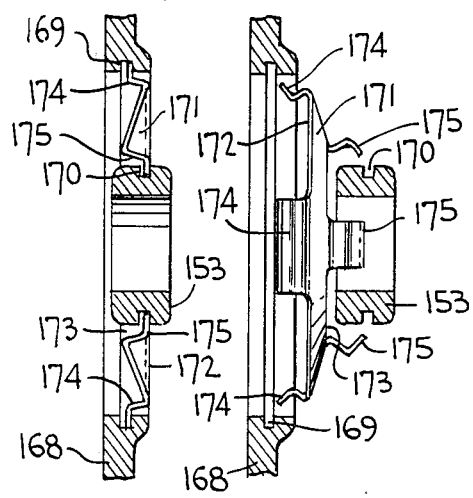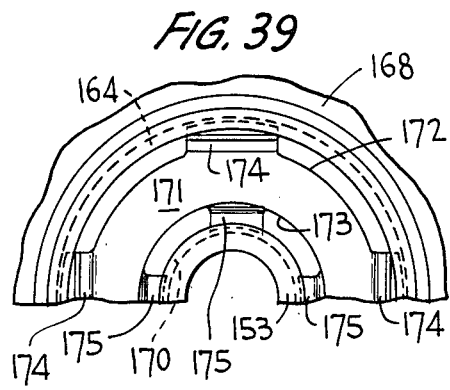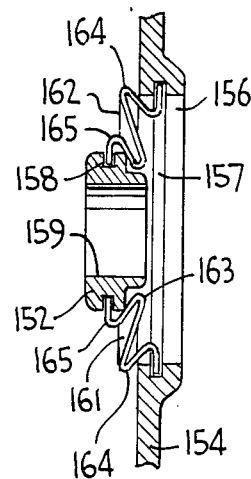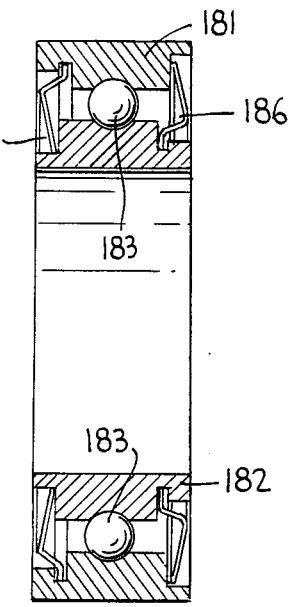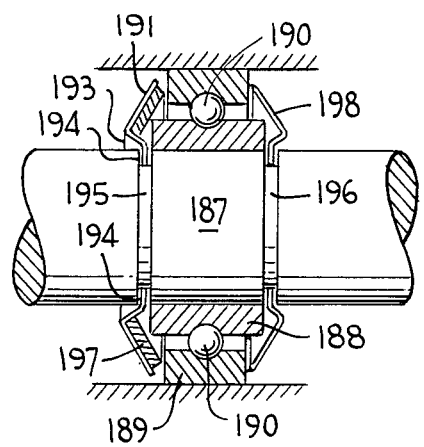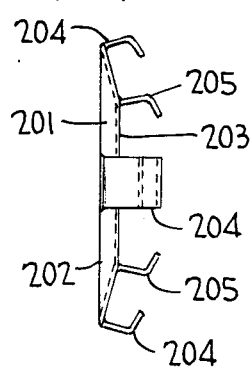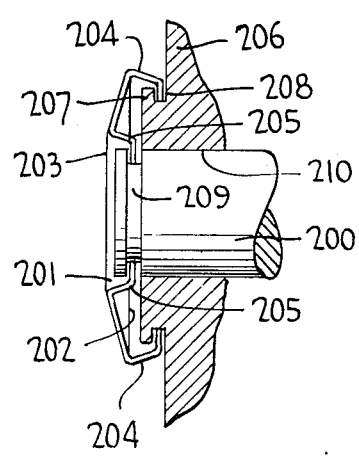

BISTABLE SHAFT RETAINING ELEMENT

TECHNICAL FIELD

The present invention relates to an article of manufacture and method of retaining a shaft to prevent longitudinal removal of the shaft from a journaled or similar mounting or from another shaft. More particularly, the present invention relates to improved cotter pins, retainer rings, and shaft couplings.

BACKGROUND OF THE INVENTION

Cotter pins conventionally take the form of split pins which are inserted into a transverse bore in a shaft to prevent the shaft from moving longitudinally out of its bearings. The pin is inserted by hand or by a tool whereupon the two split ends are spread apart with the aid of the tool to prevent unintentional removal of the pin. When it is desired to remove the pin a tool must also be used to straighten the bent ends. These insertion and removal procedures, with the necessity for tools, are more often than not time consuming and tiresome, particularly when the pin is deployed in relatively inaccessible locations. Moreover, once deployed, a removed split pin may not be readily used again due to the deformities and weakening imparted during insertion and removal. Further, most split cotter pins do not fit solidly in the shaft hole and therefore create considerable slack between the pin and shaft.

A prior art attempt at overcoming the aforementioned disadvantages of the split cotter pin is found in U.S. Pat. No. 3,263,552 to Fischer. That patent discloses a bent resilient wire which includes a pin portion extending through the shaft bore and a ring portion which surrounds the shaft concentrically. This device leaves two of the split cotter pin problems unsolved. The first unsolved problem resides in the fact that the portion of the device which is inserted in the transverse shaft bore does not solidly fit therein resulting in significant slack between the pin and shaft. The other unsolved problem resides in the fact that, although no tool is required to deploy the resilient device, the deployment requires that the pin and ring portions must be forced apart to effect deployment and removal, the required force being such that two hands are generally required. Deployment and removal, therefore, are not easy to accomplish in locations having difficult access. Moreover, forcing the two portions apart often results in permanent deformation of the device, rendering it useless for its intended purpose.

Prior art retainer rings are generally incomplete annular members which surround a reduced-diameter portion of a shaft to be retained. Such devices are resiliently spread open for purposes of deployment and removal. Often, particularly in locations of limited access, spreading of the retainer ring to effect deployment and/or removal is difficult at best.

Prior art shaft couplings tend to be either difficult to deploy or expensive. Many such couplings are unable to tolerate axial, radial and/or angular misalignment of the coupled shafts. Some shaft couplings must be permanently mounted on the shafts and are unable to be removed without being destroyed.

SUMMARY OF THE INVENTION

It is therefore an object of the present invention to provide a cotter pin which can be quickly deployed or removed with one hand or a simple hand tool, can be re-used any number of times, ensures a good fit even with considerable variation in the dimensions of the parts to be secured, and is simple and inexpensive to fabricate.

It is another object of the present invention to provide a retainer ring which is simple to deploy and remove, can be re-used any number of times, and does not require plastic deformation to be deployed or removed.

It is another object of the present invention to provide an improved shaft coupling which tolerates axial, radial and angular shaft misalignment, is inexpensive to manufacture, and which can be deployed and removed with great simplicity.

In accordance with the present invention, an improved cotter pin, an improved retainer ring and an improved shaft coupling each employ a positionally bistable domed annular disc in which the two stable positions are characterized by a reversal in the direction of the concavity of the disc. In the cotter pin embodiment a projection from the outer rim of the disc is bent back toward the underside of the disc and inserted to solidly fit in a transverse bore of a shaft. The projection is inserted into the bore with the disc oriented convex toward the bore and positioned adjacent the end of the shaft. When snapped into an orientation so as to be concave toward the bore, the disc moves to a position concentric about the shaft.

The inner rim of the disc is sized to preclude diametric slack between the disc and shaft. In the preferred cotter pin embodiment, the projection is a rolled spring metal tube which resiliently fits into the shaft bore.

The retainer ring includes a plurality of fingers projecting from spaced locations on either or both of the outer and inner rims of the disc and bent back along the disc underside. When the disc is disposed concentrically about the shaft and convexly oriented toward a circumferential slot in the shaft, the fingers are retracted to a diameter equal to or greater than that of the shaft. When the disc is snapped to its other stable orientation, concave toward the slot, the distal ends of the fingers snap radially inward to a diameter less than that of the shaft to fit into the slot. The fingers may frictionally engage the shaft rather than a specially-provided slot in the shaft. In another embodiment the fingers engage one or more slots in a bore in which the shaft is retained rather than engaging the shaft.

The shaft coupling likewise includes plural fingers projecting from one or both rims to engage suitably provided shoulders, slots, notches, or the like of the shafts in the closed or coupled state of the disc. In the uncoupled state of the disc the fingers are spaced from the shoulders, etc., to permit simple removal and/or deployment of the disc.

The positionally bistable disc is readily snapped between its stable positions using the fingers of one hand, thereby permitting simple deployment and removal even in relatively inaccessible locations. Since the spring-like material of the device is made to snap between two stable positions, the device does not require plastic or even destructive deformation when being deployed or removed.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a view in plan of a blank from which a cotter pin can be formed in accordance with the present invention;

FIG. 2 is a side view of a cotter pin formed from the blank of FIG. 1 and shown partially deployed on a shaft shown in partial section;

FIG. 3 is a side view similar to that of FIG. 2 showing the cotter pin fully deployed;

FIG. 4 is a plan view of a blank from which a retainer ring can be formed in accordance with the present invention;

FIG. 5 is a side view in plan of a retainer ring formed from the blank of FIG. 4 and shown partially deployed on a shaft;

FIG. 6 is a side view similar to FIG. 5 showing the retainer ring fully deployed;

FIG. 7 is a side view in plan of another retainer ring embodiment of the present invention showing the ring in its open position;

FIG. 8 is a side view in plan of the retainer ring of FIG. 7 shown in its closed position in conjunction with a retained shaft shown in partial section;

FIG. 9 is a top view in plan of a blank from which the retainer ring of FIGS. 7 and 8 is made;

FIG. 10 is a side view in plan of still another retainer ring according to the present invention showing the ring in its open position;

FIG. 11 is a side view in plan of the retainer ring of FIG. 10 shown in its closed position in conjunction with a retained shaft shown in partial section;

FIG. 12 is a top view in plan of a blank from which the retainer ring of FIGS. 10 and 11 is made;

FIG. 13 is a side view of a shaft coupling element according to the present invention wherein the element is shown in plan and the coupled shafts are shown in section;

FIG. 14 is a view in section taken along lines 14—14 of FIG. 13;

FIG. 15 is a view in section taken along lines 15—15 of FIG. 13;

FIG. 16 is a view similar to that of FIG. 13 but showing the coupling element in its disengaged position;

FIG. 17 is a plan view of a blank from which the coupling element of FIGS. 13 and 16 is made;

FIG. 18 is an end view in plan of another shaft coupling element according to the present invention;

FIG. 19 is a side view in partial section taken along lines 19—19 of FIG. 18 and showing the coupling element deployed to couple three shafts together;

FIG. 20 is a plan view of a blank used to fabricate the coupling element of FIGS. 18 and 19;

FIG. 21 is a side view showing another retainer ring embodiment in plan and deployed on a shaft disposed in a bore shown in section;

FIG. 22 is a view similar to FIG. 21 but wherein the retainer ring is disengaged;

FIG. 23 is a side view in plan of another retainer ring embodiment of the present invention;

FIG. 24 is a side view in plan and partial section showing the retainer ring of FIG. 23 deployed on a shaft;

FIG. 25 is a view in section taken along lines 25—25 of FIG. 24;

FIG. 26 is a top view in plan of a blank from which the retainer ring of FIGS. 23 and 24 is fabricated;

FIG. 37 is a detailed view in partial section of a retainer ring employed as one of the bearing mounts for the motor of FIG. 36, the retainer ring being shown in its closed position;

FIG. 38 is a view similar to that of FIG. 37 showing the retainer ring in its open position;

FIG. 39 is an end view in plan of the bearing mount detail illustrated in FIG. 37;

FIG. 40 is a detailed view in partial section of a retainer ring employed as the other bearing mount of the motor in FIG. 36;

FIG. 41 is a view in section of a ball bearing showing a retainer ring according to the present invention, in plan, serving as a bearing mount;

FIG. 42 is a view in section of another ball bearing showing using another bearing mount of the present invention shown in plan;

FIG. 43 is an end view in plan of another retainer ring of the present invention shown in its open position; and FIG. 44 is an end view in plan showing the retainer ring of FIG. 43 deployed on a shaft disposed in a bore shown in section.

DESCRIPTION OF PREFERRED EMBODIMENTS

Figure 27:
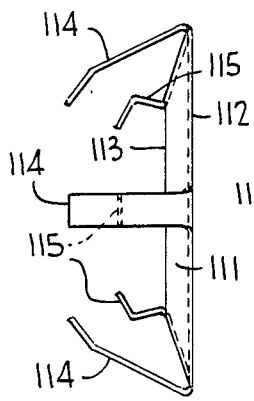
FIG. 27 is a side view in plan of another shaft coupling element of the present invention.

Referring more specifically to FIG. 1 of the accompanying drawings, there is illustrated a blank 10 for forming a cotter pin according to the present invention. Blank 10 is made from a sheet of spring steel or the like in the preferred embodiment. Alternatively, the blank may be made of other spring-like material such as plastic, etc. The blank 10 includes an annular disc 11 which is domed into the plane of the drawing in FIG. 1. Disc 11 includes an outer rim 12 and an inner rim 13. The diameter of inner rim 13 is selected to permit disc 11 to fit concentrically and in slidable relationship about a shaft to be secured by the cotter pin. Outer rim 12 can be any convenient diameter, and if desired, need not be circular. Disc 11 has two stable positions wherein it is domed on opposite sides of outer rim 12. A similar bistable spring disc is described for use in a thermostatic switch in U.S. Pat. No. 1,988,345 to Vaughn. As used in this specification and the following claims, a bistable spring disc is a spring disc which is capable of assuming only a first or a second stable position when no external force is applied thereto, and which snaps from one stable state to the other when sufficient external force is applied to move the disc beyond a threshold position from one stable position, the internal stresses stored in the disc as it is forced past the threshold position causing movement of the disc from the threshold position to the second stable position without the application of a further external force. The operation of such bistable devices is well known as exemplified by U.S. Pat. No. 3,090,626. The disc may be snapped from each stable position to the other by simply forcing the domed inner rim 13 in opposition to the dome direction while forcing outer rim 12 in the opposite direction. This can readily be achieved with the thumb and forefinger or thumb and middle and forefingers of one hand.

Blank 10 further includes a tongue 14 projecting radially outward from outer rim 12. The width of tongue 14 is substantially uniform from its root 17 to a relatively short intermediate portion wherein generally V-shaped notches or grooves 16 extend transversely toward one another from the sides of the tongue to considerably narrow the tongue width in that region. From grooves 16 out to distal or free end 18 of the tongue, the tongue is considerably wider than at other portions of its length and, in use, is rolled transversely to form a generally C-shaped transverse cross-section on fold lines 19, 21. This tubular section 22 is diametrically compressible (i.e. its longitudinal edges can be forced closed to one another) due to the resilience of the material to permit this portion of the tongue to be inserted into a transverse bore of a shaft in a solid fit engagement.

In order to provide a stronger tongue against shear effects, the tongue can be made in the form of a conventional spiral roll pin.

In use, the blank 10 is bent transversely of tongue 14 in an area between root 17 and notches 16 as illustrated in FIGS. 2 and 3. This bend is made such that a full 180° angle is formed between tubular section 22 and the outer rim 12 of disc 11 when the disc is in its locked stable position wherein the disc side facing tubular section 22 is concave (FIG. 3). When the disc side facing tubular section 22 is convex, the bend angle between section 22 and outer rim 12 is somewhere between 90° and 180°; this is the open stable position of the device (FIG. 2). The cotter pin is initially placed on a shaft 26, which is journaled in a support 27, by inerting tubular section 22 through a transverse bore 28 defined through the force end of the shaft. The initial (i.e. before insertion) diameter of tubular section 22 is preferably slightly larger than that of bore 28 so that the tubular section must be diametrically compressed to fully insert the tubular section in the bore. Upon full insertion the distal end 18 of the tubular section extends out through the opposite side of the bore 28 and the tubular section is circumferentially compressed in the bore to provide a solid or snug fit. Disc 11 is then snapped from its open stable position in FIG. 2 to its closed stable position in FIG. 3 by forcing inner rim 13 away from shaft 26 and outer rim 12 toward the shaft 26 using applied finger pressure. When in its closed stable position, disc 11 is disposed concentrically about shaft 26 with inner rim 13 circumferentially abutting or very slightly spaced from the shaft near the shaft end. With disc 11 stably positioned about the shaft, movement of the pin transversely of the shaft is precluded. Likewise, rotational movement of tubular section 22 about its longitudinal axis or about an axis perpendicular to its longitudinal axis is precluded by the concentric engagement of the shaft by disc 11. Movement of the tubular section 22 longitudinally of the shaft is precluded by bore 28. The shaft itself is prevented from moving downward (as viewed in FIG. 3) by the fact that the longitudinal dimension of tubular section 22 is greater than the diameter of the hole in member 27 in which shaft 26 is journaled. A similar cotter arrangement at the opposite end of the shaft may be used to preclude upward shaft movement. If desired, a washer 29 can be interposed between the cotter pin and member 27 on shaft 26.

Removal of the cotter pin is achieved by applying finger pressure to snap disc 11 from its closed position of FIG. 3 to its open position of FIG. 2. In the open position, tubular section 22 can be withdrawn from bore 28. Importantly, the cotter arrangement has not been permanently deformed by deployment and can therefore be re-used indefinitely. Moreover, simple application of finger pressure with one hand makes it convenient to remove or deploy the cotter pin, even in locations having difficult access.

If desired, portions or all of outer rim 12 can be extended so that, in the closed position of FIG. 3, those portions abut member 27. This provides a resilient abutment which precludes significant axial movement of shaft 26. As another alternative, tubular section 22 may be a separate cylindrical member secured to tongue 14 by welding or the like and circumferentially sized to securely fit in shaft bore 28.

In any case, the cotter pin of FIGS. 1-3 is inexpensive to fabricate, particularly in the preferred emodiment of spring metal wherein it can be stamped or otherwise formed in a short and simple operation. The tubular section 22, having an expansible diameter, ensures an accurate fit, even with considerable variation in dimensions of parts. In addition, the cotter pin is easily deployed and removed and can be re-used indefinitely.

The retainer ring blank of FIG. 4 includes a domed annular disc 31, of spring steel or the like, similar to disc 11 of FIG. 1. Disc 31 has an outer rim 32 and an inner rim 33 and is positionally bistable in the same manner as disc 11. Four radially projecting fingers 34 extend outwardly from equally spaced locations of outer rim 32. The number of such fingers is not intended as a limiting feature of the invention.

Fingers 34 are bent such that, in the closed stable position of disc 31 (FIG. 6), the fingers are bent 180° relative to the outer rim 32 of the disc. This closed position is defined as that wherein the side of the disc facing fingers 34 is concave. In the open position of the disc (FIG. 5), the side of the disc facing fingers 34 is convex and the bend angle between fingers 34 and inner rim 32 is less than 180°. In the open position of FIG. 5, the distal or free ends of fingers 34 are spaced from one another to define a circle having a diameter equal to or greater than the diameter of a shaft 36 to be retained by the retainer ring. In this position the retainer ring may be inserted onto shaft 36 and slid longitudinally along the shaft toward a circumferential slot 37 defined in the shaft. In this regard, the diameter of inner rim 33 is sized to be equal to or greater than the diameter of the shaft 36. When the retainer ring is positioned with the distal ends of fingers 34 proximate slot 37, disc 31 can be snapped by applied finger pressure to its closed position of FIG. 6 wherein the distal ends of fingers 34 project into slot 37. The cicle defined by the distal ends of fingers 34 in this closed position of disc 31 has a diameter which is smaller than that of shaft 36 but equal to or larger than the reduced diameter in slot 37. In this closed position the retainer ring is precluded from longitudinal movement along shaft 36 by the presence of fingers 34 in slot 37. Transverse movement of the retainer ring relative to the shaft is precluded by the engagement of the shaft by fingers 34 in slot 37. The retainer ring can rotate about the longitudinal axis of shaft 36 but this does not interfere with the primary function of the retainer ring, namely, to prevent longitudinal movement of shaft 36. In this respect, the shaft is journaled in a hole in body member 38, the hole being smaller than the retainer ring. It will be appreciated that the retainer ring precludes longitudinal shaft movement in only one direction and that two such rings, or another shaft retaining device, would be required to preclude movement in two directions.

The retainer ring can normally be sprung to its open position by simply applying finger pressure to disc 31. Alternatively, it is possible to provide an actuator tube disposed concentrically about shaft 36 which can be used to apply axial force against the convex or domed side of disc 31 to snap it to its other position.

The disclosed retainer ring, like the disclosed cotter pin, is simple and inexpensive to manufacture, is easily deployed and removed without the need for a tool, and is re-usable indefinitely. If desired, the fingers can be bent so as to exert resilient spring force against member 38 in the closed position (FIG. 6) whereby to preclude significant axial shaft movement or to elastically preload shaft 36 against member 38.

The retainer ring need not have the fingers projecting from the outer rim of the disc; instead, the fingers may project from the disc inner rim; Moreover, the ring need not fit over and engage the shaft; instead, the ring may engage the bore in which the shaft is retained, thereby serving as an axial stop. An embodiment having both of these features is illustrated in FIGS. 7-9. A domed annular disc 41, similar to discs 11 and 31 described hereinabove, has an outer rim 42 and an inner rim 43 and is positionally bistable in the same manner as discs 11 and 31. A plurality (for example, four) projecting fingers 44 extend from inner rim 43 and are integral with the disc. Fingers 44 of the blank of FIG. 9 are bent back generally toward the outer rim 42 along one side of the disc which is concave in the open position of the device (as illustrated in FIG. 7). The extent of the bending is such that the distal ends of the fingers 44, in open position of the device, are radially spaced from the disc center by a distance which is no greater than the radius of a bore 46 in which a shaft 47 is to be retained. Shaft 47 may be a hollow cylinder, as shown, or take any other configuration, hollow or solid, within the confines of the bore. The ring is deployed by pushing it, in its open position, axially into bore 46, with the concave side of the disc facing into the bore, until the distal ends of fingers 44 are proximate annular slot 48 defined in the bore wall. Slot 48 defines the limit or stop for shaft 47 at one end of the bore. With one's fingers or a suitably provided simple elongated tool, the inner rim 43 is pressed toward shaft 47 until disc 41 snaps to its closed position illustrated in FIG. 8. In this position, fingers 44 project into slot 48 and the disc has its concave side facing away from shaft 47.

A shaft retaining function, without engaging the shaft with the projecting fingers, can also be provided by a disc having fingers projecting from the outer disc rim. Such an embodiment is illustrated in FIGS. 10, 11 and 12 wherein like elements bear the same reference numerals employed in FIGS. 7, 8 and 9. The only difference between the two embodiments resides in the fact that fingers 49 in FIGS. 10, 11 and 12 project from outer rim 42. It is noted each finger 49 is bent only slightly back along the disc and additionally includes a substantially perpendicular bend between its root and its distal end. This configuration permits the distal ends of fingers 49 to engage slot 48 in the closed position of the device.

It should be noted that slot 48 in FIGS. 8 and 11 need not be a continuous annular slot but may instead comprise a plurality of spaced annular segments arranged to receive respective fingers therein.

The postionally bistable device embodiments described hereinabove have one or more projections extending from the outer rim or inner rim of the disc but not from both rims. It should be understood, however, that such an embodiment is possible and a coupling element for two shafts is illustrated as including this feature in FIGS. 13-17. A positionally bistable annular disc 51 of the type described hereinabove includes an outer rim 52 and inner rim 53. Four fingers 54 project from outer rim 52 and four more fingers 55 project from inner rim 53. The number of fingers is a matter of choice and need not be the same for fingers 54 and fingers 55. The spacing between successive fingers 54 is equal and 90° as is the spacing between successive fingers 55, although the spacing also is a matter of choice. In addition, each finger 54 is disposed at the same angular position as a finger 55 and this too is a matter of choice.

In order to serve as a shaft coupling element as illustrated in FIGS. 13 and 16, the disc 51 has fingers 54 and 55 bent substantially perpendicular to the disc at their roots. However, fingers 54 and 55 are bent in opposite directions with fingers 54 being bent toward the convex side of the disc in its open position (FIG. 16) whereas fingers 55 are bent toward the opposite side of the disc. In addition, each of fingers 54, 55 is bent a second time, again substantially perpendicularly, back toward the disc, this second bend being very close to the distal ends of the fingers.

Disc 51 is arranged to couple two shafts 56 and 57 to one another. Both shafts are hollow cylinders which are arranged to be coupled at respective adjacently disposed ends. The coupled end of shaft 56, as best illustrated in FIG. 14, has an annular lip 58 with a plurality of angularly spaced cut-out notches 59 defined therein at positions to receive respective fingers 55 in the closed position of disc 51. An annular slot 61 is defined in the inner cylindrical wall of hollow shaft 56 immediately behind lip 58. Shaft 57, as best illustrated in FIG. 15, is provided with an annular flange 62 extending radially outward from its end to be engaged. A plurality of angularly spaced notches 63 are defined in the periphery of flange 62 at locations corresponding to the spacing of fingers 54 of disc 51.

For deployment of the shaft coupling element, adjacent ends of shafts 56 and 57 are spaced slightly to permit insertion of disc 51 edgewise therebetween. The disc is inserted in its open stable position wherein it is concave toward shaft 56 and convex toward shaft 57 as illustrated in FIG. 16. Disc 51 is rotated until fingers 54 align with notches 63 and fingers 55 align with notches 59. The disc is then snapped to its closed stable position illustrated in FIG. 13 such that its concave surface faces shaft 57. In this position, fingers 54 project through notches 63 while fingers 55 project through notches 59. The bends in fingers 54 and 55 proximate the distal ends of the fingers engage flange 62 and lip 58, respectively, to prevent axial separation of the shafts. At the same time, notches 59 and 63 engage fingers 54 and 55, respectively, to prevent rotational and radial displacement between the shafts. Importantly, the coupling has flexibility and therefore tolerates a relatively large degree of axial, radial and angular misalignment of the shafts.

As a shaft coupling, disc 51 is highly advantageous in that it is inexpensively manufactured as a single piece and is removable without destroying the shafts or the coupling element itself. The shafts are joined in an axially spaced condition, permitting simple insertion and removal of the coupling element by merely snapping it from one stable position to the other. Importantly, there is no need to move the shafts to remove the coupling element.

Another shaft coupling/retainer element is illustrated in FIGS. 18, 19 and 20. The blank from which the coupling is formed is illustrated in FIG. 20 and includes a domed annular positionally bistable disc 71 of the type described hereinabove. Disc 71 includes outer rim 72 and inner rim 73 and is provided with fingers 69 projecting from its outer rim 72 and fingers 68 projecting from its inner rim 73. There are six angularly spaced outer rim fingers 69 but only three inner rim fingers 68 in the particular example illustrated in FIGS. 18-20. By properly bending fingers 68 and 69, the coupling/retainer element is able to retain three concentric hollow shafts 74, 76, 77 (FIG. 19) in a bore 78 of a support or further concentric shaft 79. Each of support 79, shaft 74 and shaft 76 has a respective annular slot 81, 82 and 83 defined in its inner wall. When disc 71 is in its closed or coupling position as illustrated in FIG. 19, each of slots 81, 82 and 83 receives three of fingers 68, 69. Specifically, inner fingers 68 are received in slot 83 and alternate outer fingers 69 are received in slots 81 and 82. To this end, inner fingers 68 are bent at substantially right angles away from disc 71 at their roots and then bent again proximate their distal ends at some appropriate smaller angle to be received by slot 83 in the closed disc position. Alternate fingers 69 are similarly bent to engage slot 81, whereas the remaining fingers 69 are bent at an acute angle relative to disc 71 at their roots and then again at an appropriate large angle at their distal ends to be received by slot 82. The disc 71 is initially inserted in its open position (not shown) wherein its concave surface faces shafts 74, 76, 77. When fingers 68, 69 are appropriately aligned with respect to slots 81, 82, 83, the disc is snapped to its illustrated closed position wherein its convex surface faces the shafts. It should be noted that, in this position, the bent distal ends of the fingers 68, 69 not only rest in their respective slots but also provide a resilient shoulder abutment for the immediately inward shaft. This resilient engagement provides for resilient axial coupling between the shafts. In addition, each of the shafts is free to rotate relative to the others. Of course, if mutual rotatability is not desirable in a particular application, annular slots 81, 82, 83 can be replaced by notches in the same walls to receive the fingers 68 and 69 in a non-rotatable engagement.

The embodiment illustrated in FIGS. 21 and 22 is a retainer for shaft 96 wherein disc 91 includes fingers 94 projecting from outer rim 92 and fingers 95 projecting from inner rim 93. An annular slot 97 is provided in shaft 96 and arranged to receive the appropriately bent fingers 94, 95 in the closed position of the disc (FIG. 21).

Another retainer ring embodiment is illustrated in FIGS. 23-26 and is characterized by the fact that the edges of the distal ends of the engaging fingers are contoured arcuately to match the curvature of the retained shaft at the region of contact. Domed annular positionally bistable disc 101 has an outer rim 102, inner rim 103 and a pair of oppositely projecting fingers 104 having distal ends which flare outwardly to terminate in arcuately contoured edges 105. The portion of retained shaft 106 which projects beyond support 108 is provided with an annular slot 107. Edges 105 are contoured to match portions of the shaft 106 in slot 107. The contoured finger edges 105 provide a larger region of contact and therefore a more secure contact than a non-contoured edge. This embodiment is also characterized by the fact that the diamater of the inner rim 103 is shown smaller than the diameter of shaft 106 so that disc 101 does not surround the shaft in the retained position best illustrated in FIG. 24. Instead, disc 101 is disposed beyond the end of the shaft which is contacted only by the contoured edges 105.

Figure 28:
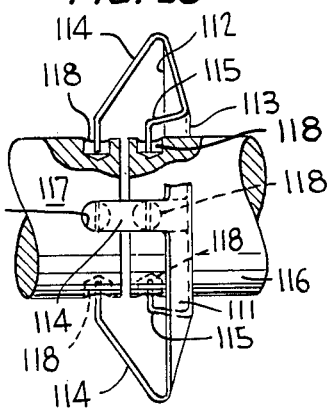
FIG. 28 is a side view showing the element of FIG. 27 in plan and deployed to couple two shafts shown in partial section.

The embodiment of FIGS. 27 and 28 is a shaft coupling element adapted to couple two shafts at their adjacent ends which are similarly configured as opposed to the different shaft end configurations in the embodiment of FIGS. 13-16. A domed annular positionally bistable disc 111 includes outer rim 112, inner rim 113, projecting fingers 114 from the outer rim and projecting fingers 115 from the inner rim. There are four each of fingers 114 and 115 in the illustrated embodiment. Fingers 114 and 115 are all bent at their roots to the same side of disc 111, that side being the side which is convex in the open or non-coupling position of the disc illustrated in FIG. 27. The ends of all the fingers are also bent, the total bend of each finger being made in accordance with the following considerations: (1) In the open or non-coupling position of disc 111 (FIG. 27), the distal ends of all fingers 114, 115 must be sufficiently separated to permit one of the shafts to be coupled (for example, shaft 116 in FIG. 28) to pass therebetween and through disc 111; and (2). In the closed or coupled position of disc 111 (FIG. 28), the distal ends of fingers 114 and 115 must extend radially inward with respect to the central longitudinal axis A—A of the disc and the shafts 116, 117 being coupled. Each shaft 116 is provided, proximate its coupled end, with four radially-extending and angularly spaced holes or recesses 118. These recesses are positioned to be engaged by the distal ends of fingers 114, 115. Specifically, disc 111 in its open position is placed concentrically about shaft 116 and positioned axially and angularly until fingers 114 and 115 are aligned with respective holes 118. The disc is then snapped to its closed position (FIG. 28) wherein the distal ends of fingers 114 extend radially into the recesses 118 in shaft 117 and the distal ends of fingers 115 extend radially into the recesses 118 of shaft 116. In this condition shafts 116 and 117 are coupled against rotational, radial or axial separation. Importantly, the flexibility of the coupling element spring couples the shafts against misalignment in any of these dimensions.

Figure 29:
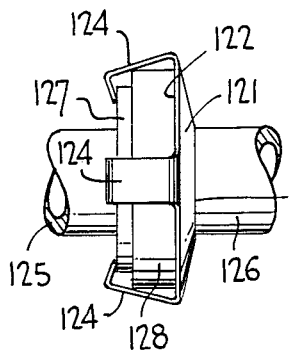
FIG. 29 is a side view in plan showing another shaft coupling element of the invention engaging two shafts.
Figure 30:
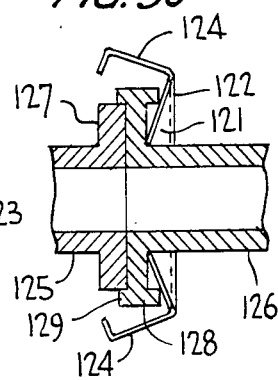
FIG. 30 is a view similar to FIG. 29 showing the shafts in section and the coupling element disengaged.

The coupling embodiment illustrated in FIGS. 29 and 30 is adapted to clamp together the ends of two tubes or shafts and is even suitable as closure for a mason jar or other container. A domed annular positionally bistable disc 121 includes an outer rim 122, an inner rim 123 and a plurality of fingers 124 projecting from outer rim 122. Fingers 124 are bent at their roots to approximately form a right angle with the disc 121. The distal ends of the fingers are bent, also at substantially right angles, radially inward of the disc. The elements to be clamped are shown as hollow shafts 125 and 126 but may be understood to represent a container and cover, respectively. Shaft 15 terminates in an enlarged annular flange 127 disposed coaxially with shafts 125 and 126. The abutting end of shaft 126 terminates in an annular flange 128 having a slightly larger diameter than flange 127. The surface of flange 128 which faces shaft 125 has at its periphery a raised annular lip 129 which defines a circular recess having a diameter substantially equal to that of flange 127. Flange 127, therefore, when abutting flange 128, is received within annular lip 129. The opposite or rearward side of flange 128 also includes a raised lip 130 to define an annular recess between lip 130 and shaft 126.

As illustrated, disc 128 is disposed concentrically about shaft 126 at the rearward side of flange 128. In the open position of the disc, illustrated in FIG. 30, inner rim 123 is disposed adjacent the rearward side of flange 128 and fingers 124 are spread from one another so as not to engage flange 127. The shafts 125 and 126 may be readily separated in this position of the disc. When disc 121 is snapped to its closed position (FIG. 29), fingers 124 project around both flanges 127 and 128 such that the bent distal ends of the fingers firmly engage the rear side of flange 127. The two shafts are thus held firmly together by the spring tension of the coupling element. As noted, this arrangement is suitable as a shaft coupler, container closure, pipe flange retainer, and numerous other clamping uses.

Figure 31:
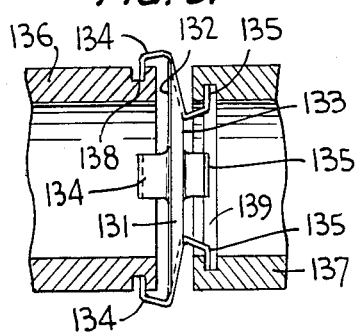
FIG. 31 is a side view in plan of another shaft coupling element of the present invention coupling two shafts shown in section.
Figure 32:
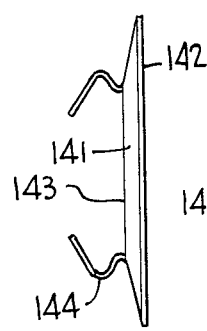
FIG. 32 is a side view in plan of another retainer ring embodiment of the present invention.

The retainer ring embodiment of FIG. 31 is used in applications where the coupled shafts are to be free to rotate relative to one another. Shaft 136 has an annular channel or slot 138 defined in its outer wall proximate its coupled end. Hollow shaft 137 has an annular channel or slot 139 defined in its inner wall proximate its coupled end. The coupling element, positioned between the two shafts, includes disc 131 shown in its closed or coupled position and having outer rim 132 and inner rim 133. Fingers 134 project from the outer rim and are adapted to ride in outer channel 138 when the disc is in its closed position as shown. Fingers 135 project from the inner rim and are adapted to ride in inner channel 139 in the closed disc position. Thus, mutual rotation of the coupled shafts is permitted while axial or radial displacement is precluded. The coupling element is simply removed by snapping disc 131 to its open position (not shown) wherein the fingers 134 and 135 clear channels 138 and 139, respectively.

Figure 33:
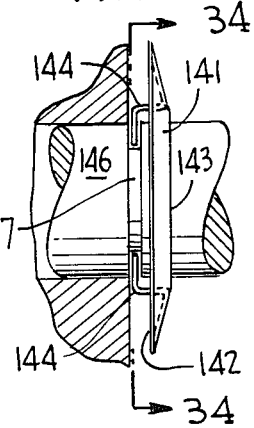
FIG. 33 is a side view of the retainer ring of FIG. 32 shown in plan and engaging a shaft also shown in plan, which is disposed in a bore shown in section.
Figure 34:
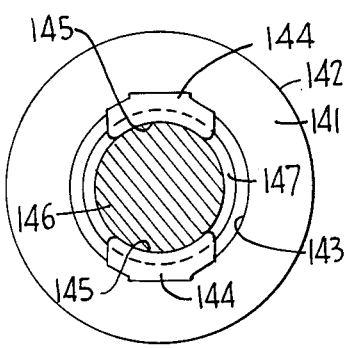
FIG. 34 is a view in section taken along lines 34—34 of FIG. 33.
Figure 35:
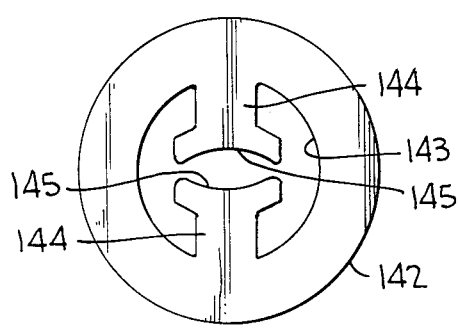
FIG. 35 is a top view in plan of a blank from which the retainer ring of FIGS. 32-34 is fabricated.
Figure 36:
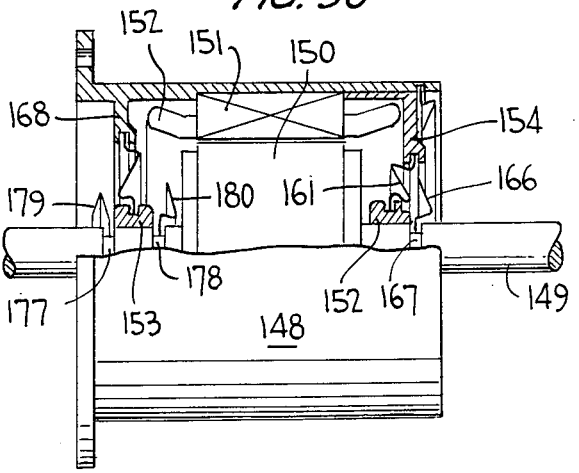
FIG. 36 is a side view in partial section of a motor assembly employing retainer rings of the present invention.

The shaft retainer ring embodiment illustrated in FIGS. 32, 33, 34 and 35 is characterized by the edge-contoured fingers projecting from the inner disc rim. Disc 141 has an outer rim 142, an inner rim 143 and a pair of fingers 144 projecting from the inner rim. The distal edges 145 of fingers 144 are contoured to match the curvature of a shaft 146 in a slot 147. Fingers 144 are bent so as to provide clearance for the shaft in the open disc position (FIG. 32) and to extend radially into slot 147 in the closed disc position (FIG. 33).

A use analogous to the retainer ring application of the present invention is as a bearing mount for motors and the like as illustrated in FIGS. 36-40. A motor includes a housing 148 through which a motor shaft 149 extends. The motor includes a rotor 150, a stator core 151 and coil 152. Shaft 149 extends through a pair of bearing rings or ferrules 152 and 153 which are supported in the housing by bistable devices of the present invention in the manner described below.

Bearing ring 152 is supported relative to a support wall 154 in housing 148. This support arrangement is shown in detail in FIG. 40. Support wall 154 is provided with an annular through-hole 156 in which an annular channel or slot 157 is defined. Bearing ring 152 has an annular channel or slot 158 defined in its peripheral wall. A through-hole 159 in the bearing ring accommodates shaft 149. The support element is a domed annular positionally bistable disc 161 having an outer rim 162 and an inner rim 163. A plurality of fingers 164 project from outer rim 162 and a further plurality of fingers 165 project from inner ring 163. Fingers 164 are bent so that, in the closed position of disc 161 (FIG. 40), the distal ends of these fingers extend into channel 157 in support wall 154. Fingers 165 are bent so that, in the closed disc position, the distal ends of these fingers extend into channel 158 in the bearing ring. The bearing ring is thus resiliently supported by the disc with considerable axial tolerance and play due to the resiliency of the support. In addition, this support permits axial preloading if desired. With reference back to FIG. 36, axial positioning of shaft 149 relative to support wall 154 may be defined by a retainer ring 166 and shaft slot 167, the retainer ring taking the form of one or more of the retainer ring embodiments described hereinabove.

Bearing ring 153 is supported relative to a further support wall 168 in the manner shown in detail in FIGS. 37-39. An annular channel 169 is defined in a through-hole in support wall 168; a peripheral channel 170 is defined in bearing ring 170. A domed annular positionally bistable disc 171 includes an outer rim 172, inner rim 173, plural fingers 174 projecting from the outer rim and plural fingers 175 projecting from the inner rim. The fingers 174 are bent so that in the open position of the disc (FIG. 38) the disc can be inserted through the through-hole in support wall 168. The fingers 175 are bent so that, in the open disc position, the bearing ring 152 can be passed through the inner rim 173 of the disc. In the closed position of the disc (FIG. 37) the fingers 174 extend into channel 169 in wall 168 and fingers 175 extend into channel 170 in bearing ring 153. The bearing ring 153 is thus supported with the same characteristics noted for the support of ring 152. The supports may be readily disengaged and removed by simply snapping the discs 161 or 171 to their open positions.

Referring again to FIG. 36, bearing ring 153 is shown axially positioned between two slots 177, 178 on shaft 149 by respective retainer rings 179, 180 which correspond to different retainer ring embodiments of the present invention as described hereinabove.

It should be noted that the primary difference between the support arrangement of FIG. 40 and that of FIGS. 37-39 resides in the fact that the width of disc 161 is sufficiently great between rims 162 and 163 to permit it to serve as a dust cover by resiliently impinging against bearing ring 152 and wall 154 in the closed position of the disc. This feature can be used for neither or both support arrangement, if desired.

The embodiment of FIG. 41 illustrates how the present invention is useful as an integral dust cover for two concentric members 181, 182 which are mutually rotatable by means of a ball bearing arrangement 183. Inner member 182 is disposed within outer member 183. Two rings 184, 186 are disposed at opposite ends of the members; ring 184 is shown as the type illustrated and described in relation to FIGS. 10-12 hereinabove, while ring 186 takes the form illustrated in FIGS. 33-36 herein. Of course, both rings 184 and 186 may be of the same type and other such rings described herein may be employed. It is noted that the discs close the openings between members 181 and 182 and thereby serve as dust covers.

A similar application of the present invention is illustrated in FIG. 42. A shaft 187 is concentrically positioned within an annular bearing ring or support member 188 arranged to rotate with respect to a concentrically disposed annular support 189 by means of a ball bearing arrangement 190. The shaft has a pair of annular channels 195, 196 defined therein at opposite axial sides of member 188. A domed annular bistable disc 191 has an outer rim 192, an inner rim 193 and a plurality of fingers 194 projecting from the inner rim. The inner rim 193 is disposed about shaft 187 proximate channel 195 and fingers 194 are bent to extend radially into that channel in the closed position of the disc. In this position, the disc surface facing member 188 is concave. This surface has a pad 197 of felt or similar material secured thereto to abut members 188 and 189 and provide a dust cover feature for the space between the members. It is noted that this abutment is facilitated by the fact that, in the closed disc position, a portion of the pad 197 is disposed concentrically about member 188. A similar disc 198 is disposed on the opposite side of member 188 to engage channel 196 but, for purposes of example, does not include a felt pad. The disc itself serves as a dust cover in that its outer rim, in the closed position, abuts member 189 and covers the spacing between members 188 and 189. In addition to serving as dust cover function, the pad 197 and disc 198 may also be used to retain lubricant in the space between members 188 and 189.

The retainer ring embodiment illustrated in FIGS. 43 and 44 serves to retain a shaft 200 against axial movement in both axial directions. The retainer takes the form of the domed annular positionally bistable disc 201 of the present invention. Disc 201 includes an outer rim 202, an inner rim 203, a plurality of fingers 204 projecting from the outer rim and a plurality of fingers 205 projecting from the inner rim. Shaft 200 includes an annular channel or slot 209 defined proximate its retained end. The portion of shaft 200 which includes channel 209 projects out from a bore 210 in a support member 206 in which the shaft is retained. Support member 206 includes an annular flange 207 disposed concentrically about bore 210, which flange projects away from the support member so as to define annular channel or slot 208 at the rear of the flange between the flange and the main body of the support member.

In the open position of disc 201 (FIG. 43) the distal ends of fingers 205 are mutually spaced to permit these fingers to pass axially along shaft 200 to slot 209. Likewise, the distal ends of fingers 204 are mutually spaced to permit these fingers to pass over flange 207 to channel 209. When the disc 201 is closed, fingers 205 engage slot 209 while fingers 204 engage slot 208. Thus, by means of disc 201, the shaft is axially fixed in both directions relative to support 206.

In the various embodiments disclosed herein successive projecting fingers are spaced at regular angular distances; this, of course, is by way of example only and the finger spacing can be chose in any manner consistent with the recesses, channels, slots or other configurations to be engaged by the fingers. Moreover, the fingers need not engage recesses, slots or other depressions in certain applications where frictionally engage between the distal ends of the fingers and the retained element is all that is required.

The essential feature of the cotter pin, the retainer ring and the shaft coupler is the bistable disc which permits deployment and removal without destroying the device. While such discs have long been used (as in the aforementioned Vaughn patent) in electrical switching applications, their adaptability for use as shaft retaining and coupling elements has not been recognized.

While I have described and illustrated various specific embodiments of my invention, it will be clear that variations of the details of construction which are specifically illustrated and described may be resorted to without departing from the true spirit and scope of the invention as defined in the appended claims.

I claim:

1. A shaft retaining element for preventing axial movement of a shaft in one direction through an aperture in a member through which the shaft extends, said shaft having a portion adapted to be engaged by said element, said element comprising:

a projecting member for engaging said shaft at the portion thereof adapted to be engaged by said element, said projecting member being movable traverse to the axis of said shaft between a first position whereat it limits axial movement of said shaft in said one direction and a second position whereat it disengages from said shaft to permit axial movement of said shaft in said one direction; and, a domed annular positionally bistable disc having an inner rim sized to circumferentially engage said shaft for slidable movement axially along said shaft, and an outer rim to which said projecting member is connected;

said disc being positionally stable only in a closed position whereat the inner rim of said disc completely surrounds said shaft to prevent movement of said projecting member to said second position, or an open position whereat the inner rim of said disc does not completely surround said shaft and said projecting member can be moved to said second position.

2. The element according to claim 1, wherein said projecting member extends from and is bent relative to said outer rim and said closed and open positions are characterized by said disc presenting concave and convex surfaces, respectively, toward said bent projecting member.

3. The element according to claim 2, wherein said disc and said projecting member are made from a single piece of spring-like material.

4. The element according to claim 2, wherein said portion of said shaft is a bore extending transversely through the shaft, and wherein said projecting member fits solidly in and extends entirely through said bore when said inner rim surrounds said shaft.

5. The element according to claim 4, wherein said projecting member is generally tubular and has a generally C-shaped transverse cross-section with a periphery that can be decreased by applying a circumferential compressing force thereto, and wherein the transverse cross-sectional size of said projecting member, absent circumferential compressive force applied thereto, is slightly larger than the transverse size of said bore.

6. The element according to claim 4 or 5, wherein said projecting member is substantially parallel to said outer rim in said closed position of said disc and is skewed relative to said outer rim in said open position of said disc.

7. The element according to claim 4 wherein said disc and projecting member are made of a single piece of spring metal.

8. A method of precluding axial movement of a shaft in one direction through an aperture in a member through which the shaft extends, said method comprising:
providing a shaft retaining element comprising a domed annular positionally bistable disc having an inner rim sized to circumferentially engage the shaft for slidable movement axially along said shaft, and an outer rim having a projecting member extending therefrom;
engaging said projecting member with said shaft to prevent axial movement of said shaft in said one direction;
the engagement of said projecting member with said shaft being done while said bistable disc is in a first stable state whereby it does not surround said shaft, and,
snapping said bistable disc to a second stable state whereby said bistable disc surrounds said shaft to prevent movement of said projecting member in a direction transverse to the axis of said shaft.

* * * * *